US008687004B2

(12) United States Patent
Gonzalez et al.

(10) Patent No.: US 8,687,004 B2
(45) Date of Patent: Apr. 1, 2014

(54) FONT FILE WITH GRAPHIC IMAGES (75) Inventors: Julio A. Gonzalez, San Jose, CA (US); Tung A. Tseung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 647 days.

(21) Appl. No.: 12/917,288

(22) Filed: Nov. 1, 2010

(65) Prior Publication Data

US 2012/0105454 A1 May 3, 2012

(51) Int. Cl.
*G06T 11/00* (2006.01)

(52) U.S. Cl.
USPC ........................................................ 345/467

(58) Field of Classification Search
USPC ......................................... 345/467, 470, 471
See application file for complete search history.

(56) References Cited

U.S. PATENT DOCUMENTS

| | | | | |
|---|---|---|---|---|
| 5,715,473 A * | 2/1998 | Reed | ............................. | 715/210 |
| 5,768,569 A * | 6/1998 | Hoddie et al. | ................. | 345/501 |
| 6,332,040 B1 * | 12/2001 | Jones | ............................. | 382/197 |
| 6,426,751 B1 * | 7/2002 | Patel et al. | ...................... | 345/468 |
| 6,445,458 B1 | 9/2002 | Focazio et al. | | |
| 6,731,288 B2 | 5/2004 | Parsons et al. | | |
| 6,762,770 B1 | 7/2004 | Opstad et al. | | |
| 6,870,535 B2 | 3/2005 | Hill et al. | | |
| 7,046,848 B1 * | 5/2006 | Olcott | ........................... | 382/176 |
| 7,379,075 B2 | 5/2008 | Opstad et al. | | |
| 7,535,471 B1 | 5/2009 | Mansfield | | |
| 7,583,397 B2 | 9/2009 | Smith | | |
| 7,609,279 B2 | 10/2009 | Ruff et al. | | |
| 7,612,897 B2 * | 11/2009 | Hodder | ........................ | 358/1.11 |
| 7,623,130 B1 | 11/2009 | Burkey | | |
| 7,667,871 B1 * | 2/2010 | Roskind et al. | ................. | 358/1.9 |
| 7,692,656 B2 | 4/2010 | Opstad et al. | | |
| 2001/0050308 A1 * | 12/2001 | Paul et al. | ...................... | 235/375 |
| 2004/0196320 A1 | 10/2004 | Walmsley et al. | | |
| 2004/0207627 A1 | 10/2004 | Konsella et al. | | |
| 2005/0067498 A1 * | 3/2005 | Smith | ........................... | 235/494 |
| 2005/0162430 A1 * | 7/2005 | Stamm et al. | .................. | 345/472 |
| 2006/0017733 A1 * | 1/2006 | Matskewich et al. | ......... | 345/467 |
| 2006/0129632 A1 * | 6/2006 | Blume et al. | ................... | 709/203 |
| 2006/0170683 A1 * | 8/2006 | Lin | ............................... | 345/467 |
| 2007/0057965 A1 * | 3/2007 | Burago et al. | ................. | 345/619 |
| 2007/0211062 A1 * | 9/2007 | Engelman et al. | ............ | 345/467 |
| 2008/0068383 A1 * | 3/2008 | Dowling | ........................ | 345/441 |
| 2008/0238927 A1 * | 10/2008 | Mansfield | ...................... | 345/467 |
| 2009/0102846 A1 * | 4/2009 | Flockermann et al. | ........ | 345/440 |
| 2010/0174982 A1 * | 7/2010 | Mansfield et al. | ............. | 715/243 |
| 2010/0174983 A1 * | 7/2010 | Levy et al. | ...................... | 715/243 |
| 2010/0239160 A1 * | 9/2010 | Enomoto et al. | .............. | 382/165 |

OTHER PUBLICATIONS

PCT International Search Report and Written Opinion of the International Searching Authority mailed Mar. 16, 2012 for PCT/US11/57918.

International Preliminary Report on Patentability (Chapter 1), mailing date May 16, 2013, for corresponding International Application No. PCT/US2011/057918, 7 pages.

\* cited by examiner

*Primary Examiner* — Ryan R Yang
(74) *Attorney, Agent, or Firm* — Blakely, Sokoloff, Taylor & Zafman LLP (57) ABSTRACT

At least certain embodiments of the present disclosure include a font file having graphic image files. In one embodiment, the font includes a set of glyphs and the font file includes a set of predetermined information of each glyph and graphic image data of each glyph. The graphic image data contains a graphic image of the corresponding glyph, which may be a multi-color glyph.

22 Claims, 10 Drawing Sheets

FONT FILE WITH GRAPHIC IMAGES

FIELD OF THE DISCLOSURE

This disclosure relates to font rendering and printing.

BACKGROUND OF THE DISCLOSURE

As many word processing applications and digital publishing applications become more widely used, many new fonts have been developed to provide users with more options and flexibility in creating or authoring documents (e.g., books, slides, flyers, product literature, webpages, menus, etc.). Conventionally, a font includes a set of glyphs that define the appearance of characters in the font. Furthermore, parameters that define various characteristics of the glyphs can be provided in one or more font tables of the font. These characteristics may include dimensions of the glyphs, spacing, and color. In order to properly define these characteristics, a font may include a huge number of parameters organized in a complicated manner. For example, one conventional true type font may have a font file having thirty or more tables containing various parameters to define the glyphs of the true type font. Because of the complexity in organizing and using these parameters, glyphs of conventional color true type fonts are limited to monochrome. In other words, each glyph of conventional color true type fonts is in a single color only.

SUMMARY OF THE DESCRIPTION

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Some embodiments of the present disclosure include a method for supporting fonts with multi-color glyphs. In some embodiments, a font file is created for a font including one or more multi-color glyphs. The font file includes a set of characteristics of each multi-color glyph, such as size and outline of a respective glyph. The font file further includes graphic image data for each glyph. The graphic image data can be in any graphic format, such as, for example, Portable Network Graphic (PNG), Graphic Interchange Format (GIF), Tagged Image File Format (TIFF), Joint Photographic Expert Group format (JPEG), etc. Thus, the font file may also be referred to as a graphic image based font file. Because the graphic image data may contain a colored image of the respective glyph, which can be reproduced (e.g., rendered or printed) as a graphic image, and hence, there is no need to include complicated coding or parameters to specify the color(s) of the glyph in the font file. In some embodiments, the font file further includes a reference (e.g., a pointer) for each glyph to refer to a location of the corresponding graphic image file. The font file can be stored on a computer-readable storage medium, accessible by a layout engine and a font parser. The layout engine and font parser can access the font file to retrieve information of one or more glyphs of the font in order to render and/or print the glyphs.

Some embodiments of the present disclosure include a method for printing multi-color glyphs. In one embodiment, a layout engine sends an instruction to a graphic engine to draw a glyph of a font. In response, the graphic engine sends a request to a font parser to request information on some predetermined characteristics, commonly referred to as glyph metrics, of the glyph. The font parser accesses the font, which may be stored in a stand-alone font file or embedded in other files, to retrieve such information and returns the information to the graphic engine. In some embodiments, the glyph metrics includes the origin of the glyph (i.e., location relative to the drawing position), the advance (i.e., distance to move to after drawing the glyph), and the bounding box (i.e., the rectangular region occupied by the glyph). Based on the glyph metrics, the graphic engine sets aside a region on a printing medium, leaving the region blank. The layout engine further requests a color bitmap of the glyph from the font parser. In response, the font parser retrieves the color bitmap requested from the font and sends it to the layout engine. Using a reference in the color bitmap, the layout engine retrieves some graphic image data of the glyph from the font. Then the layout engine instructs the graphic engine to draw the image of the glyph according to the graphic image data in the blank region, thus, effectively printing the glyph at the location of the blank region.

Various devices which perform one or more of the foregoing methods and machine-readable media which, when executed by a processing system, cause the processing system to perform these methods, are also described.

Other methods, devices and machine-readable media are also described.

BRIEF DESCRIPTION OF THE DRAWINGS

The disclosure is described by way of example with reference to the accompanying drawings, wherein.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosure.

Some portions of the detailed descriptions, which follow, are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine-readable storage media (e.g., magnetic disks; optical disks; random access memory; read only memory; flash memory devices; phase-change memory) and machine-readable communication media.

At least certain embodiments of the present disclosure include one or application programming interfaces in an environment with search software interacting with a software application. Various function calls or messages are transferred via the application programming interfaces between the search software and software applications. Transferring the function calls or messages may include issuing, initiating, invoking or receiving the function calls or messages. Example application programming interfaces transfer function calls to implement various operations (e.g., search, networking, service discovery, etc.) for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region may be in a form of a window. A window is a display region which may or may not have a border and may be the entire display region or area of a display. In some embodiments, a display region may have at least one window and/or at least one view (e.g., web, text, or image content). The methods, systems, and apparatuses disclosed can be implemented with display regions, windows, and/or views.

In some embodiments, a platform provides various editing and networking operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an Application Programming Interface (API) in order to perform various editing and networking operations.

One or more APIs may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and pass data and control information using parameters via the API calls or invocations.

The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 1:
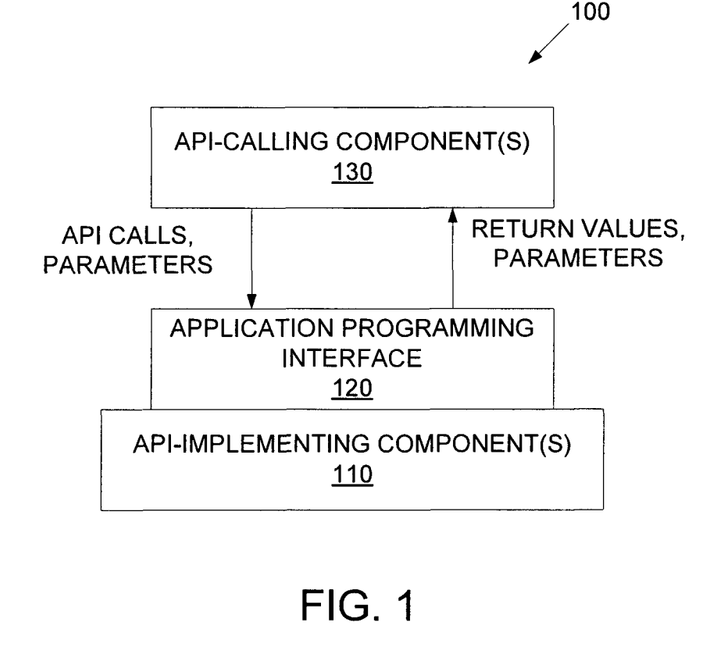
FIG. 1 illustrates a block diagram of an exemplary API architecture usable in some embodiments of the invention.

FIG. 1 is a block diagram illustrating an exemplary API architecture, which may be used in some embodiments of the invention. As shown in FIG. 1, the API architecture 100 includes the API-implementing component 110 (e.g., an operating system, a library, a device driver, an API, an application program, software or other module) that implements the API 120. The API 120 specifies one or more functions, methods, classes, objects, protocols, data structures, formats and/or other features of the API-implementing component that may be used by the API-calling component 130. The API 120 can specify at least one calling convention that specifies how a function in the API-implementing component receives parameters from the API-calling component and how the function returns a result to the API-calling component. The API-calling component 130 (e.g., an operating system, a library, a device driver, an API, an application program, software or other module) makes API calls through the API 120 to access and use the features of the API-implementing component 110 that are specified by the API 120. The API-implementing component 110 may return a value through the API 120 to the API-calling component 130 in response to an API call.

It will be appreciated that the API-implementing component 110 may include additional functions, methods, classes, data structures, and/or other features that are not specified through the API 120 and are not available to the API-calling component 130. It should be understood that the API-calling component 130 may be on the same system as the API-implementing component 110 or may be located remotely and accesses the API-implementing component 110 using the API 120 over a network. While FIG. 1 illustrates a single API-calling component 130 interacting with the API 120, it should be understood that other API-calling components, which may be written in different languages (or the same language) than the API-calling component 130, may use the API 120.

The API-implementing component 110, the API 120, and the API-calling component 130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 2:
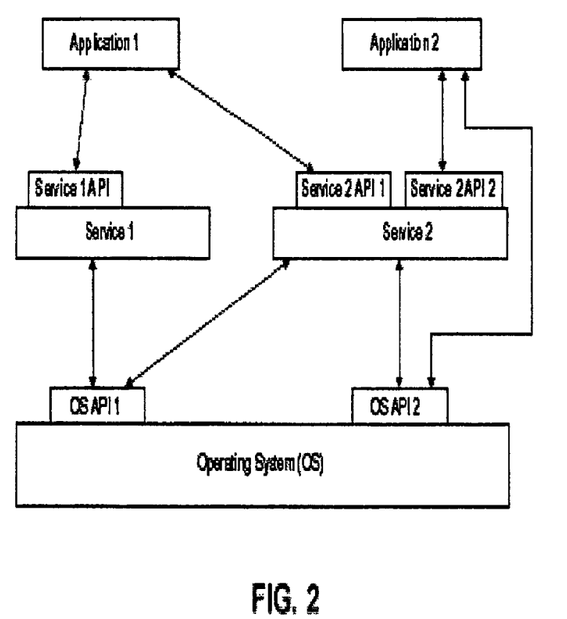
FIG. 2 is an exemplary embodiment of a software stack usable in some embodiments of the invention.

In FIG. 2 ("Software Stack"), an exemplary embodiment, applications can make calls to Services 1 or 2 using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 7:
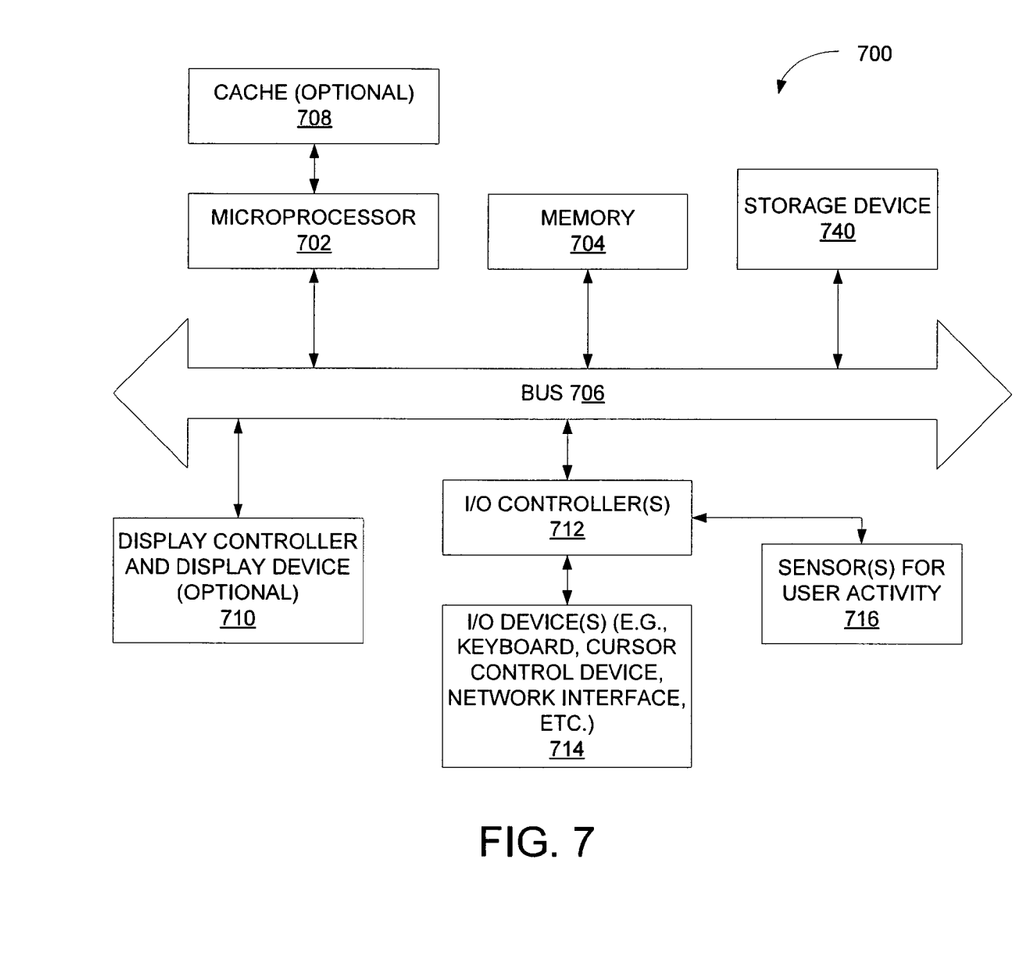
FIG. 7 shows one embodiment of a computing device usable in some embodiments of the present disclosure.

FIG. 3A-3D illustrate one embodiment of a method to support printing of a font including multi-color glyphs. In some embodiments, the method is performed by a layout engine 310, a graphic engine 320, and a font parser 330 in operation with each other. The layout engine 310, graphic engine 320, font parser 330 may be implemented with software, hardware, firmware, or a combination of any of the above. Further, the layout engine 310, graphic engine 320, font parser 330 may be executable on one or more computing devices, such as personal computers, laptop computers, personal digital assistants (PDAs), smart phones, etc. One exemplary computing device shown in FIG. 7 is discussed in details below.

Figure 3A:
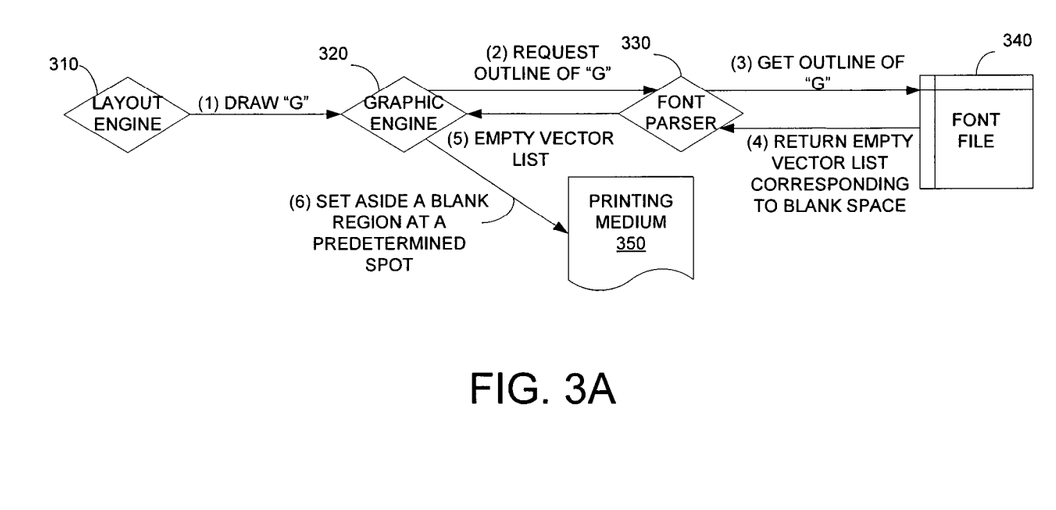
FIG. 3A-3D illustrate one embodiment of a method to support printing of a font having multi-color glyphs.

Referring to FIG. 3A, the layout engine 310 starts with sending an instruction (1) to the graphic engine 320 to draw a glyph of a font at a predetermined location on a printing medium, which may include physical printing medium (e.g., paper, slide, textile, etc.), or digital printing medium (e.g., a Portable Document Format (PDF) file rendered on a display device (e.g., a computer monitor, a touch screen, etc.)). Broadly speaking, a glyph of a font is an element of writing in the font. In some embodiments, the glyph is a multi-color glyph. In other words, the glyph has more than one color. Further, each glyph of the font may have the same or different color or combination of colors. Colored images of the glyphs are captured in graphic image data (e.g., PNG data, JPEG data, etc.), which are stored in a font file 340 of the font. Alternatively, the font file 340 may store references (e.g., pointers) to the graphic image data of the glyphs. In another embodiment, the font file 340 may store both the graphic image data of glyphs and references to the graphic image data. The font file 340 in general includes a set of data defining the font. Note that the font file 340 may be a stand-alone file or a set of data embedded in one or more files, which may be local or remote.

In some embodiments, the font file 340 includes a set of characteristics of each glyph of the font, such as size and outline of a respective glyph. In some embodiments, the font file 340 includes glyph metrics, which includes the origin of the glyph (i.e., location relative to the drawing position), the advance (i.e., distance to move to after drawing the glyph), and the bounding box (i.e., the rectangular region occupied by the glyph). The font file 340 further includes graphic image data containing an image of each glyph. The graphic image may be a colored image. The graphic image data can be in any graphic format, such as, for example, PNG, GIF, TIFF, JPEG, etc. The font file 340 can be stored on a computer-readable storage medium, accessible by the layout engine 310 and the font parser 330.

In response to the instruction (1) from the layout engine 310, the graphic engine 320 sends a request (2) for a set of glyph metrics of the glyph to the font parser 330, which retrieves the glyph metrics of the glyph from the font file 340 (3). In some embodiments, the font file 340 returns an empty vector list (4) corresponding to a blank region to the font parser 330. The font parser 330 forwards the empty vector list (5) to the graphic engine 320, which causes a printer (e.g., an ink jet printer, a laser printer, etc.) communicably coupled to the graphic engine 320 to set aside a blank region according to the empty vector list at the predetermined location on the printing medium (6).

Figure 3B:
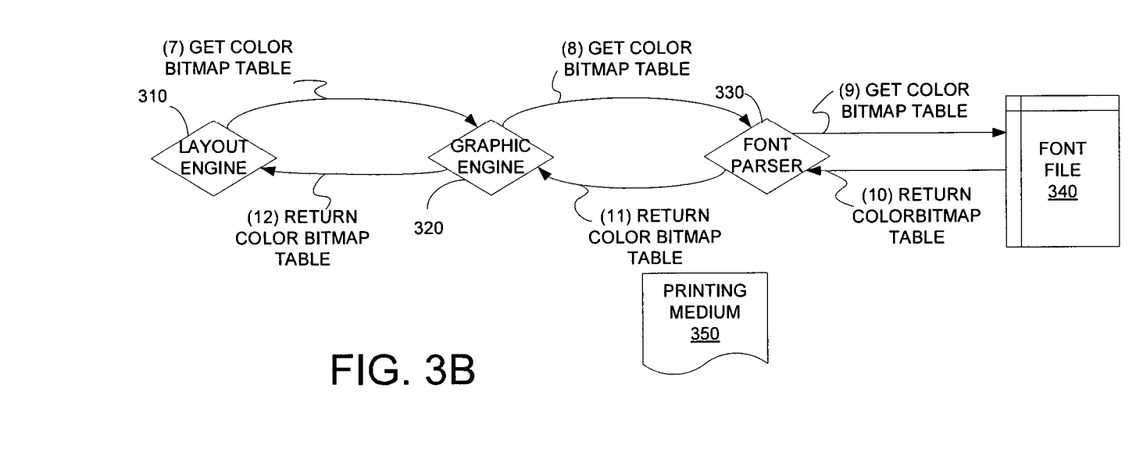

Referring to FIG. 3B, the layout engine 310 further sends a request (7) for a color bitmap file of the glyph to the graphic engine 320, which in turns requests the color bitmap file from the font parser 330 (8). The font parser 330 retrieves the color bitmap file requested (9) from the font file 340. The font file 340 sends the color bitmap file to the font parser 330 (10), and then the font parser 330 forwards it to the graphic engine 320 (11), which forwards it to the layout engine 310 (12).

In some embodiments, the color bitmap file contains a reference to some graphic image data of the glyph. The reference may be a pointer and the graphic image data may be stored at a location in the font file 340 referenced by the pointer. The graphic image data can contain a colored image of the glyph. Further, the graphic image data can be in any graphic format, such as PNG, GIF, TIFF, JPEG, etc., usable by the layout engine 310 and the graphic engine 320.

Figure 3C:
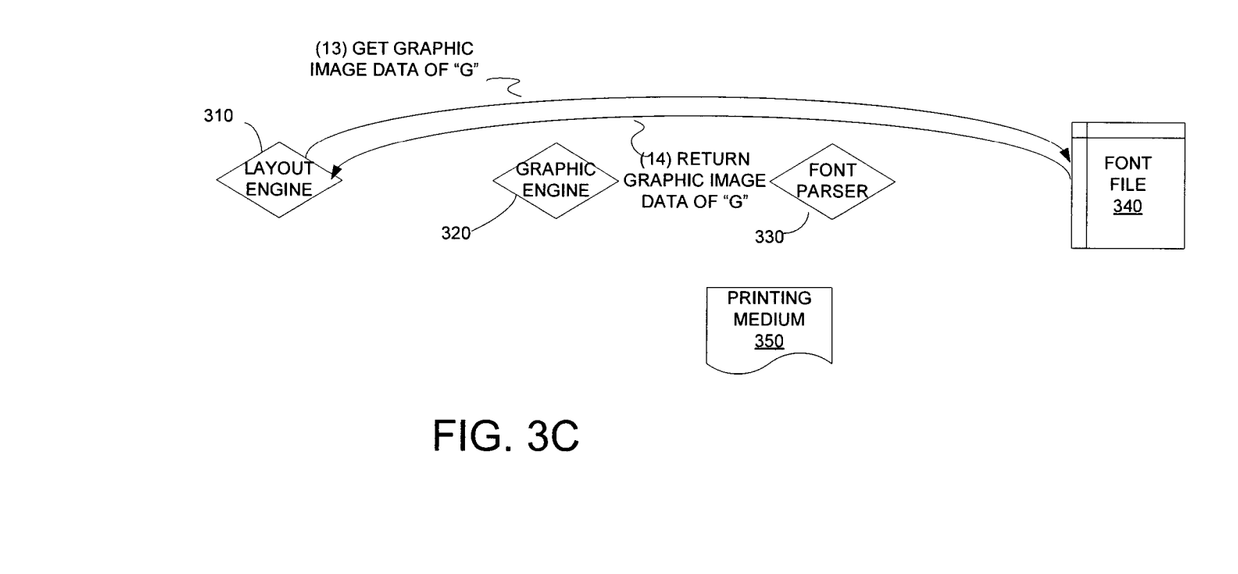

Referring to FIG. 3C, the layout engine 310 uses the reference to the graphic image data of the glyph to retrieve the graphic image data from the font file 340 (13). In response to the request (13), the font file 340 returns the graphic image data of the glyph to the layout engine 310 (14).

Figure 3D:
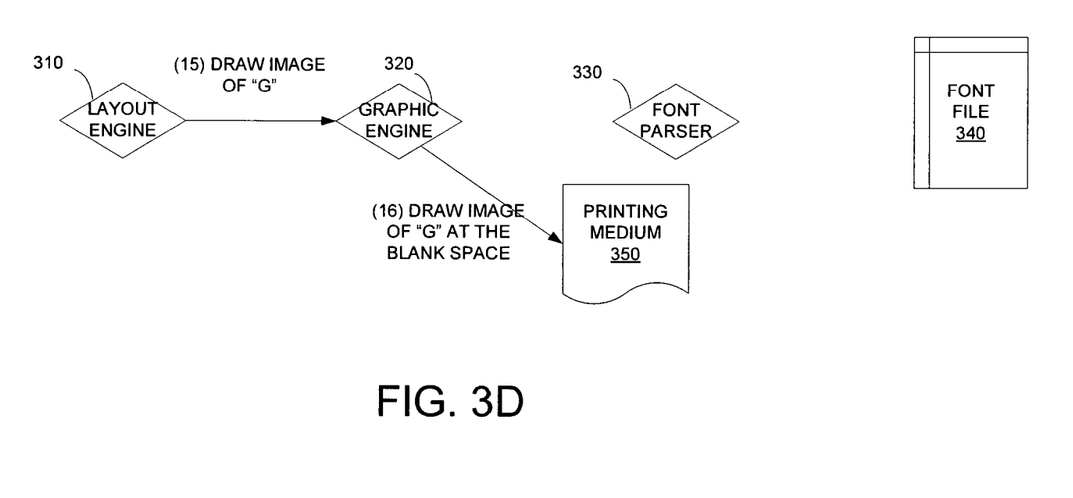

Referring to FIG. 3D, the layout engine 310 sends another instruction (15) to graphic engine 320 to draw the image of the glyph as contained in the graphic image data. In response, the graphic engine 320 causes the printer to draw the image of the glyph in the blank region previously drawn on the printing medium 350 (16). Thus, the printer effectively prints the image of the glyph in the blank region.

Because the glyph of the font is stored as a graphic image in the font file 340, both the graphic engine 320 and the printer can treat it as a graphic image, instead of a glyph, and hence, the printer can print the glyph exactly as it appears in the graphic image data. In other words, there is no need to include complicated coding in the font file 340 in order to define the color(s) and opacity of the glyph, while the layout engine 310, the graphic engine 320, the font parser 330, and the printer do not have to incorporate significant code changes in order to interpret any complex definition of the glyph, its color(s) and opacity in the font file 340. Thus, the layout engine 310, graphic engine 320, and font parser 330 can readily render and/or print the glyph (which can be multi-color) as a graphic image in order to support the font without having any significant modification to the underlying font processing code. Note that the above techniques are compatible with many conventional techniques of glyph rendering. As such, the layout engine 310, the graphic engine 320, the font parser 330, and the printer can draw a combination of conventional glyphs and multi-color glyphs defined by graphic image data as discussed above.

Figure 4:
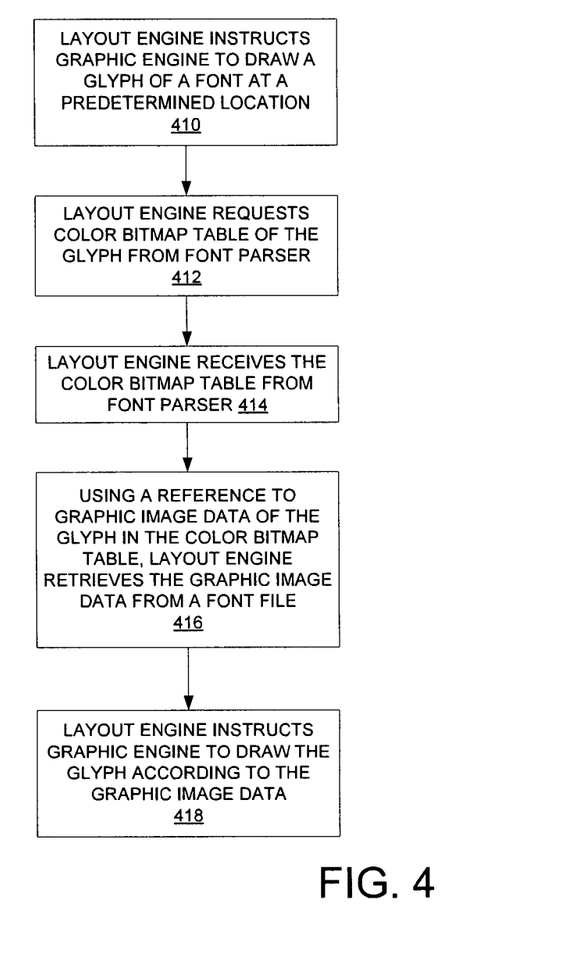
FIG. 4 illustrates a flow chart of one embodiment of a method to support printing of a font having multi-color glyphs.

FIG. 4 illustrates a flow chart of one embodiment of a method to support printing of a font having multi-color glyphs. The method can be performed by processing logic including hardware, software, firmware, or a combination of any of the above. For example, the method can be performed by the layout engine 310 illustrated in FIGS. 3A-3D in some embodiments.

Initially, the layout engine instructs a graphic engine to draw a glyph of a font at a predetermined location on a printing medium (processing block 410). In response, the graphic engine may obtain a set of glyph metrics of the glyph from a font file of the font and set aside a blank region according to the glyph metrics. In some embodiments, the glyph metrics includes the origin of the glyph (i.e., location relative to the drawing position), the advance (i.e., distance to move to after drawing the glyph), and the bounding box (i.e., the rectangular region occupied by the glyph). The layout engine further requests a color bitmap table of the glyph from the font parser (processing block 412). In response, the font parser obtains a color bitmap table of the glyph from the font file and sends the color bitmap table to the layout engine. The layout engine receives the color bitmap table from the font parser (processing block 414).

In some embodiments, the layout engine uses a reference in the color bitmap table to retrieve graphic image data of the glyph from the font file (processing block 416). Finally, the layout engine instructs the graphic engine to draw an image of the glyph according to the graphic image data retrieved in the blank region previously set aside (processing block 418).

In some alternate embodiments, the method described above can be performed exclusively by a graphics engine (such as graphics engine 320 in FIGS. 3A-3D) instead of the layout engine. One advantage of using the graphics engine to perform the above method is that the graphics engine is typically the lowest level of many operating systems to publicly draw glyphs, and hence, the graphics engine can easily handle color bitmaps.

Figure 5:
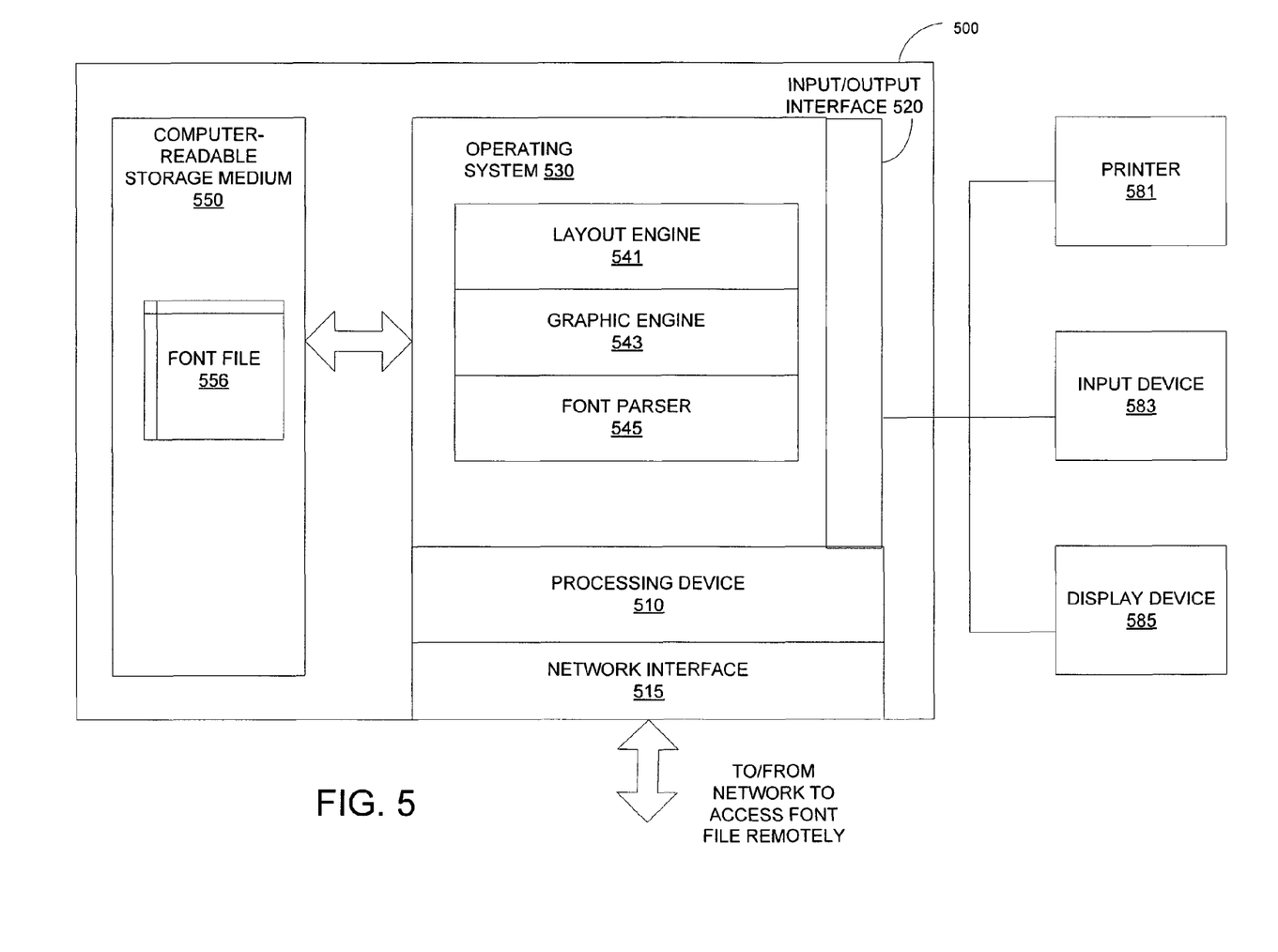
FIG. 5 illustrates a block diagram of one embodiment of a font rendering and printing apparatus.

FIG. 5 illustrates a block diagram of one embodiment of a font rendering and printing apparatus. The apparatus 500 may be implemented on a computing device, such as the one shown in FIG. 7. In some embodiments, the apparatus 500 includes a processing device 510, a network interface 515, an input/output interface 530, and a computer-readable storage medium 550, coupled to each other. The apparatus 500 further includes an operating system 520 running on the processing device 510. Through the input/output interface 530, the apparatus 500 may be communicably coupled to other devices, such as a printer 581, an input device 583, and a display device 585 as shown in FIG. 5.

In some embodiments, a layout engine 541, a graphic engine 543, and a font parser 545 run on the operating system 520. In general, the layout engine 541, a graphic engine 543, and a font parser 545 operate with each other to process, render, and print text in different fonts. The layout engine may measure the size of a glyph, determine a location of the glyph, and instruct the graphic engine 543 to draw the glyph. The graphic engine 543 may be operable to draw text in different fonts, as well as graphic images. The font parser 545 may determine various characteristics of glyphs to be drawn, such as outlines, bitmaps, and sizes of the glyphs, by accessing a font file 556.

In some embodiments, the font file 556 is stored in a computer-readable storage medium 550, such as a hard drive, a flash memory device, etc. Alternatively, a font file residing remotely may be accessed over a network by the network interface 515. In some embodiments, a font file is provided for each font supported by the apparatus 500. Furthermore, the font file 556 may be a stand-alone file or embedded in one or more files. The font file 556 includes information on various characteristics of each glyph of the font and graphic image data containing an image of at least one of the glyphs. Details of one embodiment of a font file are illustrated in FIG. 6.

Using the information from the font file 556, the graphic engine 543 can set aside a blank region (or a blank space) according to an outline of a glyph. Then the layout engine 541 may retrieve the graphic image data of the glyph from the font file 556 and instruct the graphic engine 543 to draw the image of the glyph according to the graphic image data in the blank region.

In some embodiments, the graphic engine 543 is communicably coupled to the printer 581 via the input/output interface 530. The graphic engine 543 may send instructions to the printer 581 to cause the printer to set aside a blank region at a predetermined location on a printing medium (e.g., paper), and then to draw an image of the glyph in the same color as in the graphic image data in the blank region. In other words, the graphic engine 543 and the printer 581 can simply treat the glyph as an ordinary graphic image. As such, the apparatus 500 can readily support fonts having multi-color glyphs without requiring significant changes to the code of the graphic engine 543 and/or the printer 581.

Figure 6:
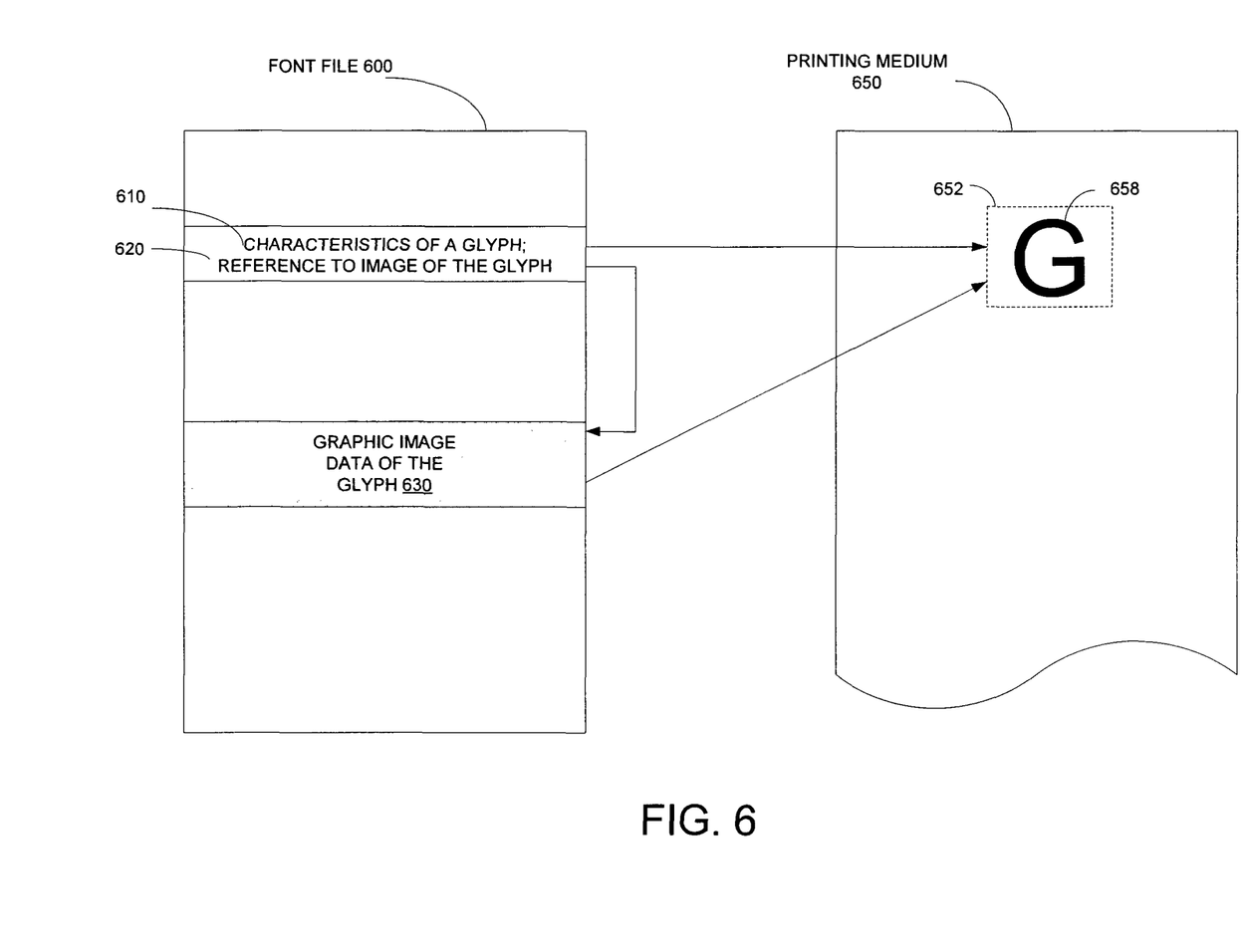
FIG. 6 shows one embodiment of a font file.

FIG. 6 shows one embodiment of a font file. The font file 600 is associated with a particular font, and contains information and graphic image data of each of a set of glyphs of the font. Note that, in some embodiments, the font file 600 may include additional glyphs defined according to one or more conventional schemes. In some embodiments, the font 600 includes multiple representations of a glyph optimized for different resolutions. Details of one exemplary glyph are discussed below to illustrate the concept of incorporating graphic image data into the font file 600.

In one example, the font associated with the font file 600 includes a glyph "G." Various information of "G" 610 is stored in the font file 600, such as outline of "G," size of "G," etc. In addition, the font file 600 includes a reference 620 (e.g., a pointer) to graphic image data 630 of "G," which is also stored in the font file 600 in the current example.

In some embodiments, the graphic image data 630 contains a color image of the glyph "G." The glyph may be of multiple colors. Further, part of the image of the glyph may be opaque. The format of the graphic image data 630 may be PNG, GIF, TIFF, JPEG, etc. Note that the formats of all the graphic image data in the font file 600 may be the same, or different in some embodiments.

Using the information 610 of the glyph, a graphic engine can set aside a blank region (e.g., a blank box 652) on a printing medium 650, which may include physical printing medium (e.g., paper, slide, etc.) and/or digital printing medium (e.g., a PDF file rendered on a display device, such as a computer monitor or a touch screen). Then the graphic engine may further draw an image 658 of the glyph according to the graphic image data 630 in the blank box 652. Details of some embodiments of a method to use such a font file 600 have been discussed above.

In some embodiments, the font file 600 can be updated by replacing one or more of the existing graphic image data of glyphs with new graphic image data of glyphs. For example, when the colors of some of the glyphs are changed, new graphic image data of the glyphs may be generated to replace the existing graphic image data of the glyphs referenced in the font file 600. To replace some existing graphic image data of a glyph in the font file 600, the reference to the existing graphic image file may simply be changed to refer to a location of the new graphic image data of the glyph.

In some embodiments, the font file 600 reside as an individual file in a computer-readable storage medium, such as a memory in a personal computer, a compact disc (CD), a flash drive, etc. Alternatively, the font file 600 may be embedded in one or more applications and/or other files (e.g., a PDF file). In some embodiments, the font file 600 may reside remotely over a network (e.g., Local Area Network (LAN), Internet, etc.).

FIG. 7 shows another example of a computing device according to an embodiment of the disclosure. This device 700 may include a processing device, such as microprocessor 702, and a memory 704, which are coupled to each other through a bus 706. The device 700 may optionally include a cache 708, which is coupled to the microprocessor 702. The device may optionally include a storage device 740 which may be, for example, any type of solid-state or magnetic memory device. Storage device 740 may be or include a machine-readable medium.

This device may also optionally include a display controller and display device 710, which is coupled to the other components through the bus 706. One or more input/output controllers 712 are also coupled to the bus 706 to provide an interface for input/output devices 714 and to provide an interface for one or more sensors 716 which are for sensing user activity. The bus 706 may include one or more buses connected to each other through various bridges, controllers, and/or adapters as are well known in the art. The input/output devices 714 may include a keypad or keyboard or a cursor control device such as a touch input panel. Furthermore, the input/output devices 714 may include a network interface, which is either for a wired network or a wireless network (e.g., an RF transceiver). The sensors 716 may be anyone of the sensors described herein including, for example, a proximity sensor or an ambient light sensor. In at least certain implementations of the device 700, the microprocessor 702 may receive data from one or more sensors 716 and may perform the analysis of that data in the manner described herein.

In certain embodiments of the present disclosure, the device 700 can be used to implement at least some of the methods discussed in the present disclosure.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A machine-readable storage medium storing executable program instructions which when executed by a data processing system cause the data processing system to perform a method comprising:
    retrieving a set of glyph metrics of a glyph from a font file;
    causing a graphic engine to set aside a blank region on a printing medium based on the set of glyph metrics;
    retrieving graphic image data of the glyph from the font file, wherein graphic image data comprises a graphical image of the entire glyph; and
    causing the graphic engine to draw an image of the glyph in the blank region on the printing medium according to the graphic image data.

2. The machine-readable storage medium of claim 1, wherein the method further comprises:
    retrieving a color bitmap table of the glyph from the font file, wherein the color bitmap table contains a reference to the graphic image data of the glyph, and retrieving the graphic image data of the glyph from the font file comprises using the reference to access the graphic image data.

3. The machine-readable storage medium of claim 1, wherein a format of the graphic image of the glyph is Joint Photographic Expert Group format (JPEG).

4. The machine-readable storage medium of claim 1, wherein the graphical image of the glyph is a multi-color graphical image.

5. A computer-implemented method, comprising:
    storing a font file of a font in a computer-readable storage medium, the font comprising a plurality of multi-color glyphs, and the font file comprising a plurality of empty vector lists associated with the plurality of multi-color glyphs, the font file further comprising graphic image data containing a multi-color image of the entirety of each of the plurality of multi-color glyphs; and
    printing one of the plurality of multi-color glyphs of the font on a printing medium according to a corresponding one of the plurality of empty vector lists and a corresponding one of the multi-color images in the graphic image data stored in the font file.

6. The method of claim 5, wherein the graphic image data is of different graphic image data formats.

7. The method of claim 5, wherein the font file further comprises a plurality of references to refer to locations of the graphic image data.

8. The method of claim 5, wherein the font file further comprises a plurality of representations of each of the plurality of multi-color glyphs, wherein each of the plurality of representations is optimized for a distinct resolution.

9. The method of claim 5, wherein printing the plurality of multi-color glyphs of the font comprises:
    for each of the plurality of multi-color glyphs, setting aside a blank region on the printing medium according to one of the plurality of empty vector lists, which corresponds to a respective multi-color glyph.

10. The method of claim 9, wherein printing the plurality of multi-color glyphs of the font further comprises:
    drawing an image of the respective multi-color glyph in the blank region according to at least part of the graphic image data corresponding to the respective multi-color glyph.

11. The method of claim 5, further comprising:
    updating the font file by replacing at least part of the graphic image data with new graphic image data of multi-color glyphs.

12. An apparatus comprising:
    a processing system programmed with executable instructions that implement:
    a font parser to access a font file to retrieve a plurality of glyph metrics of a glyph and a color bitmap table of the glyph;
    a layout engine to receive the color bitmap table of the glyph from the font parser and to retrieve graphic image data of the glyph from the computer-readable storage medium using a reference to the graphic image data in the color bitmap table, wherein the graphical image data comprises a graphical image of the entire glyph; and
    a graphic engine to receive the plurality of glyph metrics of the glyph from the font parser and to set aside a blank region on a printing medium according to the plurality of glyph metrics.

13. The apparatus of claim 12, wherein the graphic engine further draws an image of the glyph in the blank region on the printing medium according to the graphic image data in response to an instruction from the layout engine.

14. The apparatus of claim 13, wherein the graphic engine further draws the image of the glyph in a plurality of predetermined colors according to the graphic image data.

15. The apparatus of claim 12, wherein the plurality of glyph metrics of the glyph includes an origin, an advance, and a bounding box of the glyph.

16. The apparatus of claim 12, further comprising:
    a computer-readable storage medium to store the font file.

17. The apparatus of claim 12, further comprising:
    a network interface to interface with a network in order to access the font file remotely.

18. The apparatus of claim 12, further comprising:
    a printer to print the glyph on the printing medium in response to instructions from the graphic engine, wherein the printing medium includes at least one of a physical printing medium and a digital printing medium.

19. An apparatus comprising:
a processing system programmed with executable instructions that, when executed, perform a machine implemented method comprising:
storing a font file of a font having a plurality of glyphs, the font file comprising graphic image data for each of the plurality of glyphs, wherein the graphic image data comprises a graphical image of the entire glyph;
determining a size, an outline, and a location of a glyph of the plurality of glyphs using the font file; and
drawing an image of the glyph in the size determined and at the location determined using the graphical image of the glyph.

20. The apparatus of claim 19, wherein the glyph is a multi-color glyph.

21. The apparatus of claim 19, wherein the graphic image data is of different formats.

22. The apparatus of claim 19, further comprising:
printing the image of the glyph on a printing medium.

* * * * *